United States Patent
Nevill-Manning et al.

(10) Patent No.: US 7,647,300 B2
(45) Date of Patent: Jan. 12, 2010

(54) METHODS AND SYSTEMS FOR OUTPUT OF SEARCH RESULTS

(75) Inventors: Craig Nevill-Manning, New York, NY (US); Pearl Renaker, San Francisco, CA (US)

(73) Assignee: Google Inc., Mountain View, CA (US)

( * ) Notice: Subject to any disclaimer, the term of this patent is extended or adjusted under 35 U.S.C. 154(b) by 357 days.

(21) Appl. No.: 10/765,014

(22) Filed: Jan. 26, 2004

(65) Prior Publication Data
US 2007/0244854 A1   Oct. 18, 2007

(51) Int. Cl.
G06F 7/00 (2006.01)
G06F 17/00 (2006.01)
G06F 30/00 (2006.01)

(52) U.S. Cl. .................. 707/3; 707/10; 707/104.1; 715/205; 705/26; 705/27; 709/203

(58) Field of Classification Search ............. 707/1–10, 707/100–104.1, 200–201; 715/501.1, 51, 715/513; 705/26, 27; 709/203, 227, 217–224
See application file for complete search history.

(56) References Cited

U.S. PATENT DOCUMENTS

| | | | |
|---|---|---|---|
| 5,982,369 A * | 11/1999 | Sciammarella et al. ...... 715/835 |
| 6,009,442 A | 12/1999 | Chen et al. |
| 6,037,939 A | 3/2000 | Kashiwagi et al. |
| 6,058,417 A | 5/2000 | Hess et al. |
| 6,237,011 B1 | 5/2001 | Ferguson et al. |
| 6,271,840 B1 | 8/2001 | Finseth et al. |
| 6,289,353 B1 | 9/2001 | Hazelhurst et al. |
| 6,298,174 B1 | 10/2001 | Lantrip et al. |
| 6,332,135 B1 * | 12/2001 | Conklin et al. ............... 705/80 |
| 6,369,840 B1 * | 4/2002 | Barnett et al. ............... 715/853 |
| 6,567,980 B1 | 5/2003 | Jain et al. |
| 6,606,625 B1 | 8/2003 | Muslea et al. |
| 6,615,184 B1 * | 9/2003 | Hicks ........................ 705/26 |
| 6,647,383 B1 * | 11/2003 | August et al. ................ 707/3 |
| 6,678,681 B1 | 1/2004 | Brin |

(Continued)

FOREIGN PATENT DOCUMENTS

EP    0964341 A    12/1999

(Continued)

OTHER PUBLICATIONS

Newegg.com, Information from Web Archive.org http://web.archive.org/web/20020925093014/http://newegg.com/ Sep. 25, 2002.*

(Continued)

Primary Examiner—Miranda Le
(74) Attorney, Agent, or Firm—Fenwick & West LLP

(57) ABSTRACT

A search engine implements a method comprising receiving a search query, identifying a plurality of item identifiers responsive to the search query, identifying a first group of item identifiers from the plurality of item identifiers, wherein the first group of item identifiers was obtained by a first method, identifying a second group of items from the plurality of item identifiers, wherein the second group of item identifiers was obtained by a second method, and causing the output of all or a plurality of the item identifiers, comprising providing a cue to distinguish between the item identifiers from the first group and the item identifiers from the second group.

25 Claims, 3 Drawing Sheets

U.S. PATENT DOCUMENTS

| | | | |
|---|---|---|---|
| 6,732,161 B1* | 5/2004 | Hess et al. | 709/219 |
| 6,785,671 B1* | 8/2004 | Bailey et al. | 707/3 |
| 6,853,982 B2* | 2/2005 | Smith et al. | 705/27 |
| 6,920,609 B1* | 7/2005 | Manber et al. | 715/205 |
| 7,058,598 B1* | 6/2006 | Chen et al. | 705/26 |
| 7,076,443 B1* | 7/2006 | Emens et al. | 705/14 |
| 7,080,070 B1* | 7/2006 | Gavarini | 707/5 |
| 7,092,936 B1* | 8/2006 | Alonso et al. | 707/3 |
| 7,103,592 B2* | 9/2006 | Huret | 707/3 |
| 7,124,129 B2* | 10/2006 | Bowman et al. | 707/5 |
| 7,127,416 B1* | 10/2006 | Tenorio | 705/26 |
| 7,149,804 B2* | 12/2006 | Chatani | 709/229 |
| 2001/0056418 A1 | 12/2001 | Youn | |
| 2002/0065722 A1* | 5/2002 | Hubbard et al. | 705/14 |
| 2002/0099622 A1* | 7/2002 | Langhammer | 705/26 |
| 2002/0174076 A1* | 11/2002 | Bertani | 705/400 |
| 2003/0028446 A1* | 2/2003 | Akers et al. | 705/27 |
| 2003/0050865 A1* | 3/2003 | Dutta et al. | 705/27 |
| 2003/0105680 A1* | 6/2003 | Song et al. | 705/27 |
| 2003/0167209 A1* | 9/2003 | Hsieh | 705/26 |
| 2004/0073625 A1* | 4/2004 | Chatani | 709/217 |
| 2004/0107142 A1* | 6/2004 | Tomita et al. | 705/26 |
| 2005/0021997 A1 | 1/2005 | Benyon et al. | |
| 2005/0071255 A1* | 3/2005 | Wang et al. | 705/27 |
| 2005/0075940 A1* | 4/2005 | DeAngelis | 705/26 |
| 2005/0183041 A1 | 8/2005 | Chiu et al. | |

FOREIGN PATENT DOCUMENTS

| | | |
|---|---|---|
| WO | WO 01/13273 A | 2/2001 |
| WO | WO 01/46870 A1 | 6/2001 |

OTHER PUBLICATIONS

Kushmerick, Nicholas, "Wrapper induction: Efficiency and expressiveness," Artificial Intelligence, 2000, pp. 15-68, 118, Elsevier Science B.V.

Brin, Sergey et al., "The Anatomy of a Large-Scale Hypertextual Web Search Engine," 1998, Computer Science Department, Stanford University, Stanford, CA.

Laender, Alberto et al., "A Brief Survey of Web Data Extraction Tools," 2002, Department of Computer Science, Federal University of Minas Gerais, Belo Horizonte MG Brazil.

Kushmerick, Nicholas. "Finite-state approaches to Web information extraction," 2002, Computer Science Department, University College Dublin.

Kushmerick, Nicholas et al., "Adaptive information extraction: Core technologies for information agents," 2002, Computer Science Department, University College Dublin.

Chang, Chia-Hu et al., "IEPAD: Information Extraction Based on Pattern Discovery," 2001, Dept. of Computer Science and Information Engineering, National Central University, Chung-Li, Taiwan.

Muslea, Ion et al., "Hierarchical Wrapper Induction for Semistructured Information Sources," 1999, pp. 1-27, Kluwer Academic Publishers, the Netherlands.

Hsu, Chun-Nan et al., "Generating Finite-State Transducers for Semi-Structured Data Extraction from the Web," Information Systems, 1998, pp. 521-538, vol. 23, No. 8, Elsevier Science Ltd., Great Britain.

Crescenzi, Valter et al., "RoadRunner: Towards Automatic Data Extraction from Large Web Sites," Proceedings of the 27$^{th}$ VLDB Conference, 2001, Rome, Italy.

Freitag, Dayne et al., "Boosted Wrapper Induction," 2000, American Association for Artificial Intelligence.

Michael White et al., "Multidocument Summarization via Information Extraction," First International Conference on Human Language Technology Research (HLT), 2001.

J.-Y. Delort et al., "Enhanced Web Document Summarization Using Hyperlinks," HT'03, Aug. 26-30, 2003, Nottingham, United Kingdom.

Archive of "mySimon: Compare products and prices from around the Web," www.mysimon.com/index.jhtml, [online] [Archived by http://archive.org on Jun. 3, 2003; Retrieved on Jan. 10, 2007] Retrieved from the InternetURL:http://web.archive.org/web/20030603175323/www.mysimon.com/index.jhtml>.

Archive of "mySimon: Frequently Asked Questions," www.mysimon.com/corporate/index.jhtml?pgid=help, [online] [Archived by http://archive.org on Jun. 4, 2001; Retrieved on Jan. 10, 2007] Retrieved from the Internet<URL:http://web.archive.org/web/20010604082923/www.mysimon.com/corporate/index.jhtml?pgid=help>.

Archive of "mySimon: Make mySimon your homepage," www.mysimon.com/Nikon_Coolpix_5700/4014-650 . . . , [online] [Archived by http://archive.org on Dec. 7, 2003; Retrieved on Sep. 7, 2006] Retrieved from the Internet<URL:http://web.archive.org/web/20031207141726/www.mysimon.com/Nikon_Coolpix_5700/4014-650 . . . >.

Archive of "mySimon: Merchant Info," www.mysimon.com/corporate/index.jhtml?pgid=help, [online] [Archived by http://archive.org on Jun. 3, 2003; Retrieved on Jan. 10, 2007] Retrieved from the Internet<URL:http://web.archive.org/web/20030603173203/www.mysimon.com/corporate/index.jhtml?pgid=help>.

Archive of "mySimon: Shopping Guides," www.mysimon.com/index.anml, [online] [Archived by http://archive.org on May 10, 2000; Retrieved on Jan. 10, 2007] Retrieved from the Internet<URL:http://web.archive.org/web/20000510222151/www.mysimon.com/index.anml>.

Archive of "mySimon: What is mySimon," www.mysimon.com/about_mysimon/companymeet . . . , [online] [Archived by http://archive.org on May 10, 2000; Retrieved on Sep. 12, 2006] Retrieved from the Internet<URL:http://web.archive.org/web/20000510054852/www.mysimon.com/about_mysimon/company/meet . . . >.

BizRate.com web page, as provided by Internet Archive Wayback Machine at http://web.archive.org/web/20030101-20030922re_/http://bizrate.com/, as published between Jan. 1, 2003 and Sep. 22, 2003.

Crescenzi, V. et al., "RoadRunner: Towards Automatic Data Extraction from Large Web Sites," Proceedings of the 27$^{th}$ VLDB Conference, 2001, Rome, Italy.

DealTime.com web page, as provided by Internet Archive Wayback Machine at http://web.archive.org/web/20030101-20030922re_/http://dealtime.com/, as published between Jan. 1, 2003 and Sep. 22, 2003.

International Search Report and Written Opinion, PCT/US2004/038559, Mar. 16, 2005.

Sherman, C., "Yahoo! Launches New Product Search," Sep. 23, 2003, SearchEngineWatch, [online] [Retrieved on Sep. 1, 2006] Retrieved from the Internet<URL:http://searchenginewatch.com/showPage.html?page=3081551>.

Yahoo Shopping web page, as provided by Internet Archive Wayback Machine at http://web.archive.org/web/20030101-20030922re_/http://shopping.yahoo.com/, as published between Jan. 1, 2003 and 09/22/2003.

* cited by examiner

METHODS AND SYSTEMS FOR OUTPUT OF SEARCH RESULTS

FIELD OF THE INVENTION

The invention generally relates to search engines. More particularly, the invention relates to methods and systems for output of search results.

BACKGROUND OF THE INVENTION

A search engine or search engine program is a widely used mechanism for allowing users to search vast numbers of documents for information. Automated general search engines locate documents, such as web pages, by matching terms from a user entered search query to an indexed corpus of web pages. A conventional network search engine, such as the Google™ search engine, returns a search result set in response to the search query submitted by the user. The search result set can comprise a ranked list of documents with a link to each document and a summary of the document can be returned to the user. The search engine can rank or sort the individual articles or documents in the result set based on a variety of measures, such as, the number of times the search terms appear in the document and the number of documents that contain a link to a document. For example, one known method, described in an article entitled "The Anatomy of a Large-Scale Hypertextual Search Engine," by Sergey Brin and Lawrence Page, assigns a degree of importance to a document, such as a web page, based on the link structure of the web page.

Various documents, such as web pages, present items for sale. Some shopping documents allow users to purchase items, either directly, such as by clicking on a link, or indirectly, such as by providing a telephone number to complete a transaction. Users wishing to compare prices on an item from different vendors can enter a query for the item in a general search engine and obtain a list of relevant documents. Similarly, there may be different versions of the item and the user may desire to see which version each vender carries. In order to compare prices or versions, the user must often visit several documents presenting the item for sale in conventional systems. Additionally, documents may be present in the search result set that are not shopping documents, but only discuss the item, such as reviews. Manually searching through a vast number of documents to extract attributes of the item can be extremely time consuming and impractical for a large number of documents.

SUMMARY

Embodiments of the present invention comprise methods and systems for output of search results. In one embodiment, a search engine implements a method comprising receiving a search query, identifying a plurality of item identifiers responsive to the search query, identifying a first group of item identifiers from the plurality of item identifiers, wherein the first group of item identifiers was obtained by a first method, identifying a second group of items from the plurality of item identifiers, wherein the second group of item identifiers was obtained by a second method, and causing the output of all or a plurality of the item identifiers, comprising providing a cue to distinguish between the item identifiers from the first group and the item identifiers from the second group.

This exemplary embodiment is mentioned not to limit or define the invention, but to provide an example of an embodiment of the invention to aid understanding thereof. Exemplary embodiments are discussed in the Detailed Description, and further description of the invention is provided there. Advantages offered by the various embodiments of the present invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF SPECIFIC EMBODIMENTS

Figure 1:
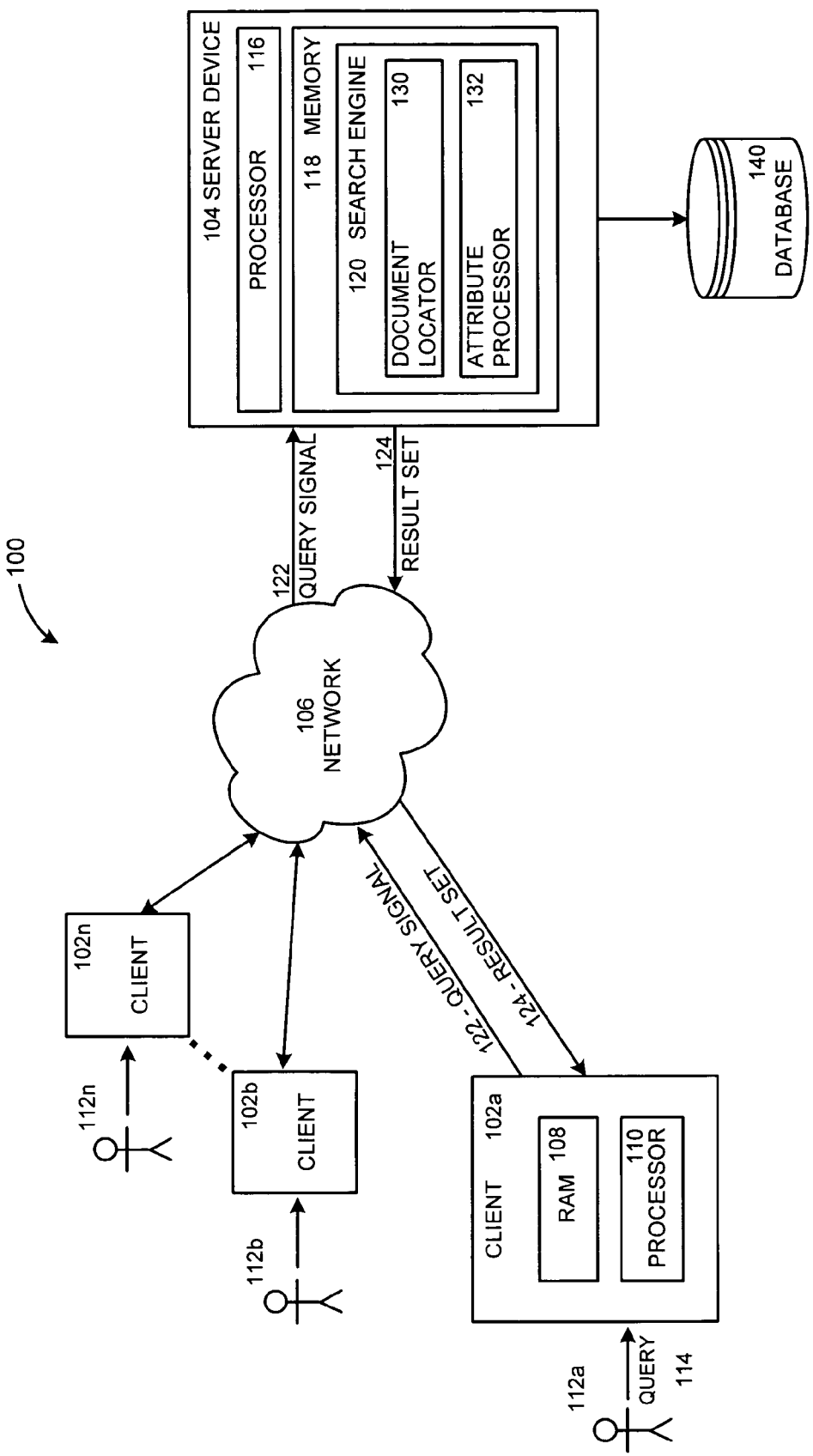
FIG. 1 is a diagram illustrating an exemplary environment in which one embodiment of the present invention may operate.

Embodiments of the present invention comprise methods and systems for output of search results. Referring now to the drawings in which like numerals indicate like elements throughout the several figures, FIG. 1 is a block diagram illustrating an exemplary environment for implementation of one embodiment of the present invention. The system 100 shown in FIG. 1 includes multiple client devices 102a-n in communication with a server device 104 over a network 106. The network 106 shown includes the Internet. In other embodiments, other networks, such as an intranet may be used. Moreover, methods according to the present invention may operate within a single computer.

The client devices 102a-n shown each includes a computer-readable medium, such as a random access memory (RAM) 108 coupled to a processor 110. The processor 110 executes computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. The instructions may comprise code from any suitable computer programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any suitable operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Using the client devices 102a-n, users 112a-n can communicate over the network 106 with each other and with other systems and devices coupled to the network 106. As shown in FIG. 1, a server device 104 is also coupled to the network 106. In the embodiment shown, a user 112a-n generates a search query 114 at a client device 102a. The client device 102a transmits the query 114 to the server device 104 via the network 106. For example, a user 112a types a textual search query regarding an item into a query field of a web page of a shopping search engine interface or other client-side software displayed on the client device 102a, which is then transmitted via the network 106 to the server device 104. In the embodiment shown, a user 112a inputs a search query 114 at a client device 102a, which transmits an associated search query signal 122 reflecting the search query 114 to the server device 104. The search query 114 may be transmitted directly to the server device 104 as shown. In another embodiment, the query signal 122 may instead be sent to a proxy server (not shown), which then transmits the query signal 122 to server device 104. Other configurations are possible.

The server device 104 shown includes a server executing a shopping search engine application program, such as the Froogle™ search engine. Similar to the client devices 102a-n, the server device 104 shown includes a processor 116 coupled to a computer-readable memory 118. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the shopping search engine application program, also known as a search engine 120. The search engine 120 locates relevant items by identifying item identifiers in response to a search query 114 from a user 112a-n. Items can include, for example, products, goods, services, and any other thing offered for sale. The search engine 120 then provides the result set 124 to the client 102a via the network 106. The result set 124 can comprise a ranked list of item identifiers and attributes for each item, such as a price, an image, an item description and an item version. The item identifier can be an item name, an item number, or link to an article offering the item for sale or any combination of item name, item number and link. The link can be a uniform resource locator (URL), a file name, an icon or anything else that identifies an article offering the item for sale. Information regarding items, comprising item identifiers and attributes associated with items, can be obtained by the search engine 120 by a variety of methods. Information regarding items can come directly from vendors offering the items for sale in the form of a vendor feed prior to receiving a search query and can be stored in memory 118 or in a database 140 or other storage device accessible by the server device 104. Information regarding items can also be automatically extracted from articles offering the items for sale prior to receiving a search query and stored in the database 140. Information regarding items can also be automatically extracted from articles offering the items for sale after receipt of the search query.

Information on items can be extracted from articles prior to the search query by various systems and methods, including, for example, the systems and methods using a template-based information extraction approach described in U.S. patent application Ser. No. 10/675,756 filed Sep. 30, 2003, which is hereby incorporated herein by this reference. Additionally, information regarding items relevant to the search query 114 can be extracted from articles by using the search query, such as, for example, described in U.S. patent application Ser. No. 10/731,916 filed Dec. 10, 2003, which is hereby incorporated herein by this reference.

The search engine 120 can cause the output, such as the display, of the search result set 124 on the client device 102a. The item identifiers can be output with a cue that distinguishes between the item identifiers based on the method by which item information was obtained or a degree of certainty of the accuracy of the item information. For example, the items information received directly from a vendor can be grouped together and displayed in a manner visually distinguishing these item identifiers from other item identifiers in the result set. Item information automatically extracted from articles can also be grouped together and displayed in a manner visually distinguishing these item identifiers from other item identifiers in the result set. In such an embodiment, the item identifiers from each group can be presented in the result set 124 to the user as visually distinct groups or the item identifiers from one group or each group can be displayed with a similar visual indication, such as an icon. Other ways of displaying the item identifiers based on the methods by which the item identifiers were initially obtained or the degree of certainty of the accuracy of the information provided with each item identifiers can be used. Systems and methods of displaying search results to a user are described in U.S. patent application Ser. No. 10/673,957 filed Sep. 29, 2003, which is hereby incorporated by this reference.

The search engine 120 can also comprise a document locator 130 and an attribute processor 132. In the embodiment shown, each comprises computer code residing in memory 118. In the embodiment shown, the server device 104, or related device, performs a crawl of the network 106 to locate articles, such as web pages, stored at other devices or systems connected to the network 106, and indexes the articles in memory 118 or on another data storage device prior to receiving and processing a search query 114. Articles include, for example, web pages of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image. During or after the crawl of the network the server device 104 or other device can determine if any of the documents crawled are shopping documents. A shopping document is a document that presents items for sale and in which the items can be purchased through interaction with the document or related documents.

In response to a search query signal 122, the document locator 130 can identify items by item identifiers and/or item attributes previously stored in the database 140 and shopping documents that contain items relevant to the search query signal 122. A shopping document can contain a single item or multiple items relevant to the search query. The attribute processor 132 can identify and extract certain attributes associated with the item or items relevant to the search query from shopping documents. In one embodiment, the attribute processor 132 identifies and extracts the price of the item and an image associated with the item from the documents located by the document locator 130 that are relevant to the search query.

It should be noted that the present invention may comprise systems having a different architecture than that which is shown in FIG. 1. For example, in some systems according to the present invention, the attribute processor 132 may be located external to the search engine 120 and may perform its functions offline before a search query from a user. The system 100 shown in FIG. 1 is merely exemplary, and is used to explain the exemplary method shown in FIG. 2.

Various methods in accordance with the present invention may be carried out. For example, in one embodiment, a search query is received, a plurality of item identifiers responsive to the search query are identified, a first group of item identifiers, obtained by a first method, from the plurality of item identifiers is identified, a second group of item identifiers, obtained by a second method, from the plurality of item identifiers is identified, and the item identifiers are output such that a cue is provided to distinguish between the item identifiers from the first group and the item identifiers from the second group. In another embodiment, a third group of item identifiers, obtained by a third method, from the plurality of item identifiers is identified, and the item identifiers are output such that a cue is provided to distinguish between the third group of item identifiers and the item identifiers from the first and second groups.

In one embodiment, the first method can be vendor feeds or automatic extraction of item identifiers and associated attributes from shopping documents. The extraction can be performed at least in part by a template-based extraction method. The extraction can also be based at least in part on the search query. In one embodiment, the first method can be vendor feeds, the second method can be template-based extraction of item identifiers and associated attributes from shopping documents, and the third method can be extraction of item information from shopping document using the search query.

In one embodiment, each item identifier in the first group is output with a visual indication, such as an icon, making it visually distinct from the other item identifiers when displayed. The output of the first group of item identifiers can be a first list and the output of the second group of item identifiers can be a second list, wherein the first list can be visually separated from the second list when displayed. Alternatively, the output of the first group of item identifiers can be a first grid and the output of the second group of item identifiers can be a second grid, wherein the first grid can be visually separated from the second grid when displayed.

In another embodiment, a search query for an item identifier received, a plurality of item identifiers responsive to the search query are identified, a first group of item identifiers, having a first degree of certainty, from the plurality of item identifiers are identified, a second group of item identifiers, having a second degree of certainty, from the plurality of item identifiers are identified, and the item identifiers are output such that a cue is provided to distinguish between the item identifiers from the first group and the item identifiers of the second group. The degree of certainty can be related to the method of obtaining item information or can relate to another factor that can influence the accuracy of the information provided for each item identifier.

Figure 2:
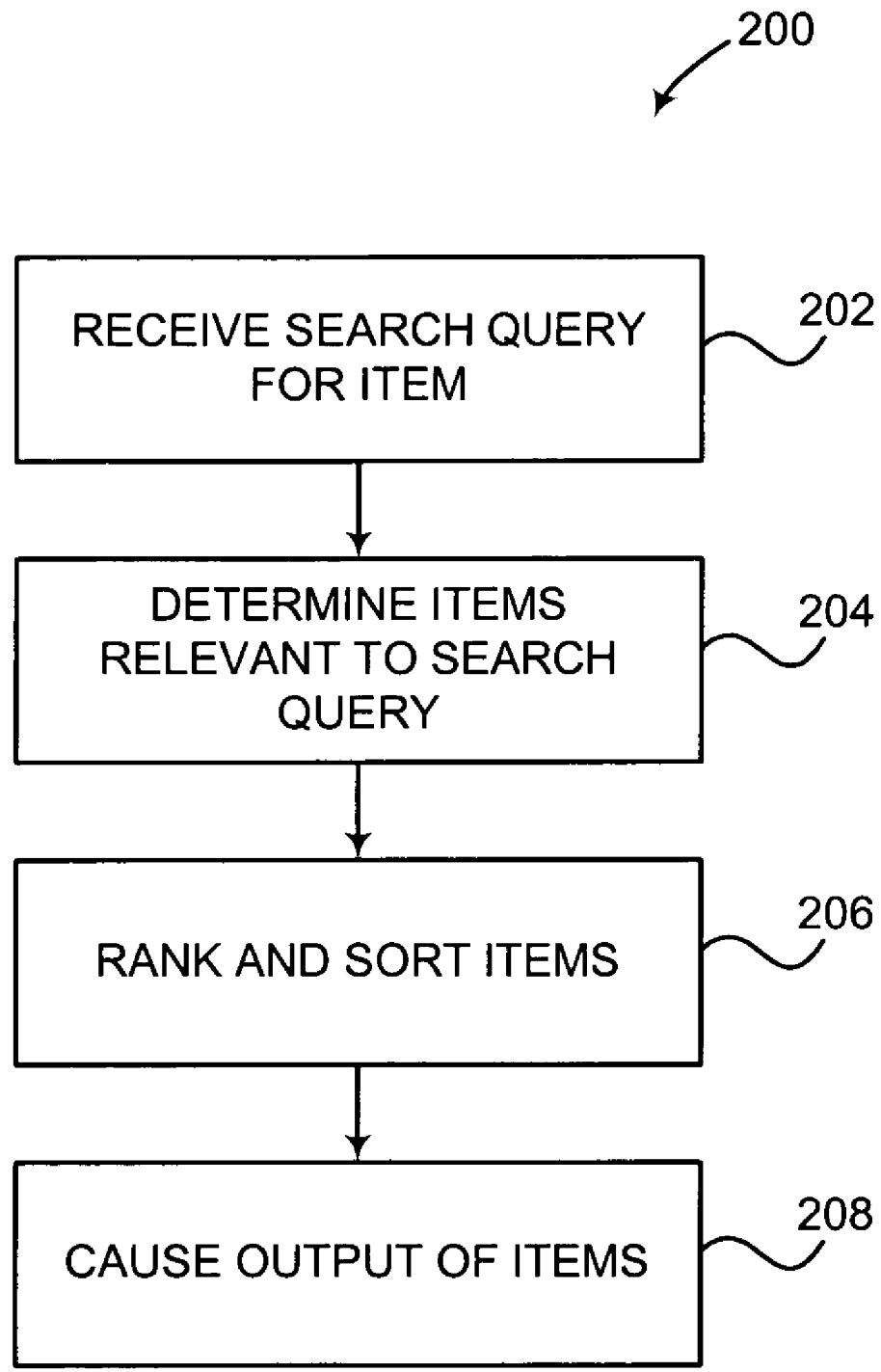
FIG. 2 is a flow diagram illustrating a method of outputting search results to a user in one embodiment of the present invention.

FIG. 2 illustrates an exemplary method 200 that provides a method for the output of search results. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

In 202, the search engine 120 receives a search query signal 122 from client device 102a via the network 106. A user 112a can input text representing an item the user is interested in into a client device 102a. The client device 102a can create an associated search query signal 122 representative of the search query 114 input by the user and transmit the search query signal 122 to the server device 104 via the network 106. For example, if the user 112a is interested in purchasing a camera, the user can input "camera" in the client device 102a and the client device can send an associated search query signal 122 to the server device 104.

In 204, the document locator 130 identifies item identifiers identifying items relevant to the item requested in the search query. For example, if the search query is "camera", the document locator 130 identifies cameras as items relevant to the query. Item information, comprising item identifiers and item attributes, can be received by the search engine 120 and indexed and stored in the database 140 prior to receiving the search query. This item information can be obtained directly from the vendor of the items in the form of vendor feeds. For example, a vendor feed can be a data stream from the vendor and can include the item identifiers that the vendor is offering for sale and attributes associated with each item, such as a price of the item, and an image of the item. Item information can also be received prior to receiving the search query by the search engine 120 by extracting information from shopping documents using a template-based extraction method or other method. Item information can also be extracted from shopping documents by the search engine 120 by using the terms of the search query.

In 206, the search engine 120 can rank and sort the item identifiers relevant to the search query to form a result set. The search engine can rank the item identifiers by any known technique, such as a hyperlink structure-based ranking method. The search engine 120 can also determine the method used to obtain each item identifier and a degree of certainty of accuracy of the attributes associated with each item identifier. For example, the item information that was received through vendor feeds can have a high degree of certainty and can be grouped together and the item information received through extraction methods can have a lower degree of certainty and can be grouped together. In another embodiment, item information that is received through extraction methods can be further grouped by the particular extraction method used.

In 208, the search engine 120 causes the output, such as a display, of the search result set 124. The item identifiers can be output so that they are displayed on a single document, such as a web page, or on multiple documents. In one embodiment, the search engine 120 can cause the display or other output of the item identifiers such as to distinguish between the item identifiers obtained by various methods through the use of a cue. A cue can comprise using different parts of a page, using different formatting, color, or font, using a header, or using different icons. For example, item identifiers from a first group obtained by vendor feeds can be displayed in list form separate from item identifiers from a second group obtained through extraction methods. Alternatively, the item identifiers from the first group or the second group or both can be displayed with a visual indication, such as an icon, indicating the method by which they were obtained. In one embodiment, the item identifiers obtained using a particular method may be formatted for display or other output differently—and thus themselves be visually distinct—relative to item identifiers obtained using another method (e.g., a different font, size, color or other attribute of the items may be used to help distinguish between items obtained using one method versus another). In another embodiment, the search engine 120 can cause the output of the item identifiers so as to provide a visual indication of the degree of certainty of the accuracy of the information associated with each item identifier. For example, item identifiers with a high degree of certainty can be displayed separately from item identifiers with a lower degree of certainty, such as two separate lists. Alternatively, item identifiers with a high degree of certainty or a lower degree of certainty or both can be displayed each with a visual indication, such as an icon, indicating the associated degree of certainty.

Figure 3:
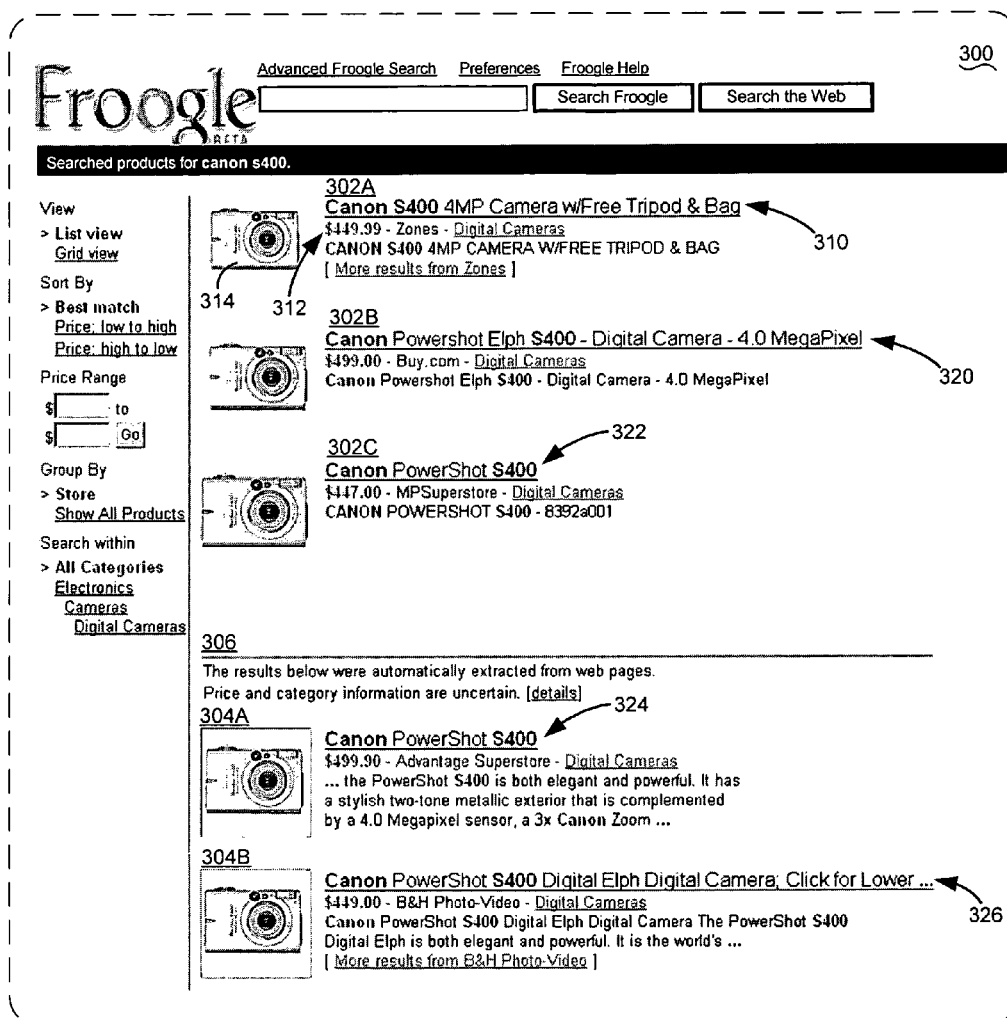
FIG. 3 is a diagram of an exemplary search results page generated for display by a search engine, in accordance with one embodiment of the present invention.

FIG. 3 illustrates an exemplary search results page 300 generated for display by the search engine 120. The search results page 300 displays a partial list view of search results 302 A-C and 304 A-B generated in response to the search query "Canon S400". Each result 302 A-C and 304 A-B shown on the page 300 has an item identifier 310, 320, 322, 324, and 326 corresponding to an item determined by the search engine 120 to be relevant to the search query and a price and an image of the item. For example, result 302 comprises item identifier 310, a price 312, and an image 314. In the embodiment shown in FIG. 3, the item identifier 310 comprises the item name and acts as a link to the shopping document offering the item for sale. The item identifier 310, in the embodiment shown in FIG. 3, also comprises additional information regarding the purchase of the item—"w/ Free Tripod and Bag".

The item identifiers 310, 320, 322, 324, and 326 are grouped by the method that the item information associated with each item identifier 310, 320, 322, 324, and 326 was initially obtained. In the embodiment shown, the item identifiers 310, 320, and 322 were obtained from vendor feeds. For example, the vendors of item identifiers item identifiers 310, 320, and 322 sent information about the items directly to the search engine 120 or related device and the search engine 120 or related device indexed and stored this information in the database 140 before the search query was received. In processing the search query, the document locator 130 matched these results 302 A-C with the search query and returned them as relevant to the search query.

In the embodiment shown, the item information associated with item identifiers 324 and 326 was obtained by extracting the item identifiers and associated attributes from shopping documents. For example, the information contained in result 304 A could have been extracted from a shopping document by using a template-based extraction method and stored in the database 140 by the search engine 120 or related device 120 before the search query was received. The information contained in result 304 B could have been located and extracted by the attribute processor 132 by using the search query.

Text 306 separates the two groups of search results. The results can be grouped as shown in FIG. 3 because the information received directly from the vendor generally has a higher degree of certainty than the information extracted from shopping documents and it is thus desirable to display more reliable information first to a user.

In the embodiment shown in FIG. 3, the first group of item identifiers 310, 320, and 322 and the second group of item identifiers 324 and 326 are displayed in list form and the two lists are separated by the text 306. Alternatively, the two groups of item identifiers 310, 320, 322, 324, and 326 can both be displayed in grid form and the two grids can be separated visually such as by a line or some other means. In another embodiment, each item identifier 310, 320, 322, 324, and 326, when displayed, can indicate the respective group that the item identifiers 310, 320, 322, 324, and 326 belongs to, such as, for example, by some visual indication displayed with each item.

In one embodiment, the second group of item identifiers 324 and 326 can be separated into two groups based on the method of extraction used to obtain the item. The display of these two groups can be separated visually.

It should be appreciated from the foregoing description of exemplary embodiments of the invention that numerous modifications are possible in other embodiments. For example, the invention could be used with various types of search mechanisms, databases and item identifiers (not just vendor-related), such as news, people/social networks, classifieds, etc. Furthermore, while exemplary methods for distinguishing between item identifiers obtained using various methods have been described, those skilled in the art will recognize from this description that various other methods may be employed without departing from the spirit and scope of the invention.

While the above description contains many specifics, these specifics should not be construed as limitations on the scope of the invention, but merely as exemplifications of the disclosed embodiments. Those skilled in the art will envision many other possible variations that are within the scope of the invention. The terms first and second are used herein merely to differentiate one item identifier, group, method, article, or attribute from another item identifier, group, method, article, or attribute. The terms first and second are not used to indicate first or second in time, or first or second in a list, or other order, unless explicitly noted. For example, the "second" may come in time or in a list before the "first," unless it is otherwise explicitly indicated.

That which is claimed:

1. A method, comprising:

receiving a search query;

identifying a plurality of item identifiers responsive to the search query, wherein each item identifier is associated with an item offered for sale and comprises information regarding the item;

selecting a first group of item identifiers from the plurality of item identifiers, wherein the first group of item identifiers was received from a vendor feed, the vendor feed comprising information from at least one vendor offering one or more items for sale;

selecting a second group of item identifiers from the plurality of item identifiers, wherein the second group of item identifiers was obtained by extraction of item identifiers from shopping documents offering one or more items for sale, the shopping documents not received directly from a vendor feed;

determining a degree of certainty that an item identifier has been correctly associated with an item, wherein the degree of certainty is based on a determination of accuracy of the information received for each item, the accuracy determination based at least in part on whether the information was received from a vendor feed; and generating an output to display at least one item identifier from the first group in a visually distinct way from at least one item identifier from the second group.

2. The method of claim 1, wherein the extraction is performed at least in part by a template-based extraction method.

3. The method of claim 1, wherein the extraction is based at least in part on the search query.

4. The method of claim 1, wherein generating an output to display comprises generating an output to display a first list and a second list, wherein the first list is visually separated from the second list when displayed.

5. The method of claim 1, wherein generating an output to display comprises generating an output to display a first grid and a second grid, wherein the first grid is visually separated from the second grid when displayed.

6. The method of claim 1, further comprising:
selecting a third group of item identifiers from the plurality of item identifiers, wherein the third group of item identifiers was obtained by a source different from direct receipt from a vendor feed and extraction from shopping documents and
generating an output to display at least one item identifier from the third group in a visually distinct way from the at least one item identifier from the first group and from the at least one item identifier from the second group.

7. The method of claim 1, further comprising:
generating an output to display a representation of the degree of certainty.

8. The method of claim 1, wherein the degree of certainty is further based on a reliability measure of the information received from the vendor feed.

9. The method of claim 1, wherein the degree of certainty is further based on a reliability measure of the information obtained through extraction of item identifiers from shopping documents.

10. The method of claim 1, wherein the vendor feed comprises a data stream received from the at least one vendor.

11. The method of claim 10, wherein the data stream includes data describing an attribute of an item offered for sale by the at least one vendor.

12. A method, comprising:
receiving a search query;
identifying a plurality of item identifiers responsive to the search query, wherein each item identifier is associated with an item offered for sale and comprises information regarding the item;
selecting a first group of item identifiers from the plurality of item identifiers;
determining a first degree of certainty that each item identifier from the first group of item identifiers has been correctly associated with a respective item, wherein the first degree of certainty is based at least in part on a first method of obtaining the item identifiers in the first group;
selecting a second group of item identifiers from the plurality of item identifiers;
determining a second degree of certainty that each item identifier from the second group of item identifiers has been correctly associated with a respective item, wherein the second degree of certainty is based at least in part on a second method of obtaining the item identifiers in the second group, the second method comprising extraction of item identifiers from shopping documents offering one or more items for sale, the shopping document not received directly from a vendor feed; and
generating an output to display a representation of the first degree of certainty and a representation of the second degree of certainty, the representations comprising a display of at least one item identifier from the first group in a visually distinct way from at least one item identifier from the second group.

13. The method of claim 12, wherein the first method of obtaining the item identifiers in the first group comprises receiving item identifier information from a vendor feed, the vendor feed comprising information from at least one vendor offering one or more items for sale.

14. The method of claim 12, wherein the second method of obtaining the item identifiers comprises extraction of item identifiers from shopping documents offering one or more items for sale, the shopping documents not received directly from a vendor feed.

15. The method of claim 12, wherein the first degree of certainty is further based on a reliability measure of the information received from a vendor feed.

16. The method of claim 12, wherein the second degree of certainty is further based on a reliability measure of the information obtained through extraction of item identifiers from shopping documents offering one or more items for sale, the shopping documents not received directly from a vendor feed.

17. The method of claim 12, wherein the first degree of certainty is further based on a determination of accuracy of the information provided for each item, the information obtained by one of extraction from shopping documents and receipt from a vendor feed.

18. A computer program product for outputting item identifiers, comprising:
a computer-readable storage medium; and
computer program code, encoded on the computer-readable storage medium, for:
receiving a search query;
identifying a plurality of item identifiers responsive to the search query, wherein each item identifier is associated with an item offered for sale and comprises information regarding the item;
selecting a first group of item identifiers from the plurality of item identifiers, wherein the first group of item identifiers was received from a vendor feed, the vendor feed comprising information from at least one vendor offering one or more items for sale;
selecting a second group of item identifiers from the plurality of item identifiers, wherein the second group of item identifiers was obtained by extraction of item identifiers from shopping documents offering one or more items for sale, the shopping documents not received directly from a vendor feed;
determining a degree of certainty that an item identifier has been correctly associated with an item, wherein the degree of certainty is based on a determination of accuracy of the information received for each item, the accuracy determination based at least in part on whether the information was received from a vendor feed; and
generating an output to display at least one item identifier from the first group in a visually distinct way from at least one item identifier from the second group.

19. The computer program product of claim 18, wherein the extraction is performed at least in part by a template-based extraction method.

20. The computer program product of claim 18, wherein the extraction is based at least in part on the search query.

21. The computer program product of claim 18, wherein generating an output to display comprises generating an output to display a first list and a second list, wherein the first list is visually separated from the second list when displayed.

22. The computer program product of claim 18, wherein generating an output to display comprises generating an output to display a first grid and a second grid, wherein the first grid is visually separated from the second grid when displayed.

23. The computer program product of claim 18, further comprising program code, encoded on the computer-readable medium, for:
selecting a third group of item identifiers from the plurality of item identifiers, wherein the third group of item identifiers was obtained by a source different from direct receipt from a vendor feed and extraction from shopping documents and generating an output to display at least one item identifier from the third group in a visually distinct way from the at least one item identifier from the first group and from the at least one item identifier from the second group.

24. A computer program product for outputting item identifiers, comprising:
a computer-readable storage medium; and
computer program code, encoded on the computer-readable storage medium, for:
receiving a search query;
identifying a plurality of item identifiers responsive to the search query, wherein each item identifier is associated with an item offered for sale and comprises information regarding the item;
selecting a first group of item identifiers from the plurality of item identifiers;
determining a first degree of certainty that each item identifier from the first group of item identifiers has been correctly associated with a respective item, wherein the first degree of certainty is based at least in part on a first method of obtaining the item identifiers in the first group;
selecting a second group of item identifiers from the plurality of item identifiers;
determining a second degree of certainty that each item identifier from the second group of item identifiers has been correctly associated with a respective item, wherein the second degree of certainty is based at least in part on a second method of obtaining the item identifiers in the second group, the second method comprising extraction of item identifiers from shopping documents offering one or more items for sale, the shopping document not received directly from a vendor feed; and
generating an output to display a representation of the first degree of certainty and a representation of the second degree of certainty, the representations comprising a display of at least one item identifier from the first group in a visually distinct way from at least one item identifier from the second group.

25. The computer program product of claim 24, wherein the first method of obtaining the item identifiers in the first group comprises receiving item identifier information from a vendor feed, the vendor feed comprising information from at least one vendor offering one or more items for sale.

* * * * *

UNITED STATES PATENT AND TRADEMARK OFFICE
CERTIFICATE OF CORRECTION

PATENT NO. : 7,647,300 B2
APPLICATION NO. : 10/765014
DATED : January 12, 2010
INVENTOR(S) : Nevill-Manning et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 634 days.

Signed and Sealed this

Sixteenth Day of November, 2010

David J. Kappos
*Director of the United States Patent and Trademark Office*